United States Patent [19]
Chavez et al.

[11] Patent Number: 5,307,386
[45] Date of Patent: Apr. 26, 1994

[54] APPARATUS AND METHOD FOR SERVICING AN ELONGATED SUSPENDED PUMP MOTOR IN AN ELECTRIC POWER PLANT WITH LIMITED ACCESS

[75] Inventors: Rossemary V. Chavez, Monroeville; Douglas E. Ekeroth, Delmont; F. Thomas Johnson, Baldwin Boro; John M. Matusz, Plum Boro, both of Allegheny Co., all of Pa.

[73] Assignee: Westinghouse Electric Corp., Pittsburgh, Pa.

[21] Appl. No.: 903,633

[22] Filed: Jun. 24, 1992

[51] Int. Cl.5 .................................... G21C 19/10
[52] U.S. Cl. .................................... 376/260; 376/262; 376/379
[58] Field of Search ............... 376/260, 262, 379, 362, 376/361

[56] References Cited

U.S. PATENT DOCUMENTS

| | | | |
|---|---|---|---|
| Re. 33,373 | 10/1990 | Gallo et al. | 376/260 |
| 3,941,259 | 3/1976 | Hoffmeister et al. | 376/260 |
| 4,696,786 | 9/1987 | Frizot et al. | 376/260 |
| 4,847,038 | 7/1989 | Martin | 376/260 |
| 4,873,760 | 10/1989 | Watanabe et al. | 376/260 |
| 4,973,433 | 11/1990 | Larson et al. | 376/260 |
| 5,019,325 | 5/1991 | Larson et al. | 376/260 |
| 5,061,432 | 10/1991 | Matusz | 376/260 |

FOREIGN PATENT DOCUMENTS 1437923 6/1976 United Kingdom .
1441465 6/1976 United Kingdom .
2068305 8/1981 United Kingdom .

Primary Examiner—Donald P. Walsh
Assistant Examiner—Frederick H. Voss
Attorney, Agent, or Firm—J. C. Valentine

[57] ABSTRACT

Elongated coolant pumps suspended under steam generators within containment in a power plant with limited access space, are removed and replaced by an elongated maintenance cart with an elongated opening along one side in which the motor is received. Rollers support the cart for conveying the elongated motor in an upright position out from under the steam generator and onto an elevator. The elevator is lowered to transfer support of the cart and motor through trunnions to saddles straddling the elevator for rotation of the cart to a generally horizontal position. The elevator then raises the horizontally disposed cart carrying the motor to a higher floor where it is rolled off the elevator and out through the auxiliary equipment hatch.

16 Claims, 11 Drawing Sheets

APPARATUS AND METHOD FOR SERVICING AN ELONGATED SUSPENDED PUMP MOTOR IN AN ELECTRIC POWER PLANT WITH LIMITED ACCESS

GOVERNMENT CONTRACT

The Government of the United States of America has rights in this invention pursuant to Contract No. DE-AC03-90SF18495 awarded by the Department of Energy.

BACKGROUND

1. Field of the Invention

This invention relates to installation and removal of large elongated pump motors suspended within a few feet of the floor beneath steam generators in electric power generating plants.

2. Background Information

In a new nuclear power plant design developed by the assignee of the present invention, the steam generators are contained within relatively narrow vertical chambers. The main canned coolant pumps are mounted on the bottom of the steam generator in an inverted position with the elongated motors, each weighing close to 40,000 pounds, extending downward to within a few feet of the floor of the chamber. Thus, access to the pump motor is very limited. Furthermore, the motor is fastened by a motor flange to a pump casing which in turn is welded to the bottom of the steam generator channel head. For removal of the pump motor, the fasteners must be removed and the motor lowered to clear the pump casing flange before it can be moved horizontally out from under the steam generator.

Commonly owned U.S. Pat. No. 5,061,432 entitled "Apparatus for Facilitating the Servicing of Inverted Canned Pump Motors Having Limited Access Space and Restricted Access Time Especially In Nuclear Power Plants" discloses a cart for facilitating installation and removal of such pump motors. This cart has a tall U-shaped frame defining a vertical opening along one elongated side. The cart is provided with rollers so it can be rolled across the floor of the steam generator chamber and into position with the suspended motor received in the elongated opening. Jacks on the cart support the motor while the stud nuts securing the motor to the pump housing flange are removed by workers standing on foldable platforms carried by the cart. The motor is then lowered by the jacks to seat the motor flange on the upper end of the cart.

The cart is then rolled out from under the steam generator and aligned with a narrow, vertical passage between the steam generator and the chamber wall. The cart supporting the motor in an upright position is then lifted by a polar crane up over the top of the steam generator chamber wall and lowered to the operating deck where it is rolled out of containment in an upright position through the main equipment hatch. The pump motor is reinstalled by reversing the above procedure.

While this maintenance cart solves the problem of removing and installing the elongated motor pumps in the very limited space available, it requires the use of the main polar crane and the main equipment access hatch. As it is important to limit plant down time as much as possible, and there are other demands for the main polar crane and the main equipment hatch during an outage, it is desirable to find an alternative procedure and necessary equipment for removing and installing the main coolant pump motors.

SUMMARY OF THE INVENTION

It is a primary object of the invention to provide an improved apparatus and method for servicing motor pumps suspended beneath steam generators in nuclear and fossil fueled electric power plants with limited access.

It is a more particular object of the invention to provide such an apparatus and method which does not require the use of the polar crane and the main equipment hatch.

These objects and others are realized by the invention which takes advantage of the fact that there is another equipment hatch available in the plant. However, this hatch does not have sufficient height to permit the previously described maintenance cart to pass through the hatch in an upright position. In addition, this hatch is located at a floor within containment which does not have adequate ceiling clearance for the maintenance cart in an upright position.

Accordingly, the invention includes an elongated maintenance cart with a U-shaped frame having an elongated opening along one side in which the motor is received with the cart in an upright position. The cart can be rotated from the upright position to a generally horizontal position to support the pump motor generally horizontally. Roller means permit the cart to be translated across the floor in the upright position to clear the steam generator and then in a horizontal position. The motor is supported in the upright position on the top of the cart by a collar on which the motor flange seats. In the generally horizontal position, a saddle near the lower end of the motor and a saddle adjacent the support collar provide support for the pump motor. The roller means support the U-shaped frame in the horizontal position with the top end of the motor adjacent the motor flange higher than the bottom of the motor so that the motor flange remains seated against the support collar. The invention further includes means, preferably in the form of trunnions on the sides of the U-shaped frame, which support the cart carrying the motor for rotation between the upright and horizontal positions.

The invention includes in addition an elevator which transports the cart carrying the pump motor between the level of the steam generator chamber floor and the level of the auxiliary equipment hatch. It also includes saddles straddling the elevator in which the trunnions on the carts are supported as the elevator is lowered to permit rotation of the cart between the upright and horizontal positions.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
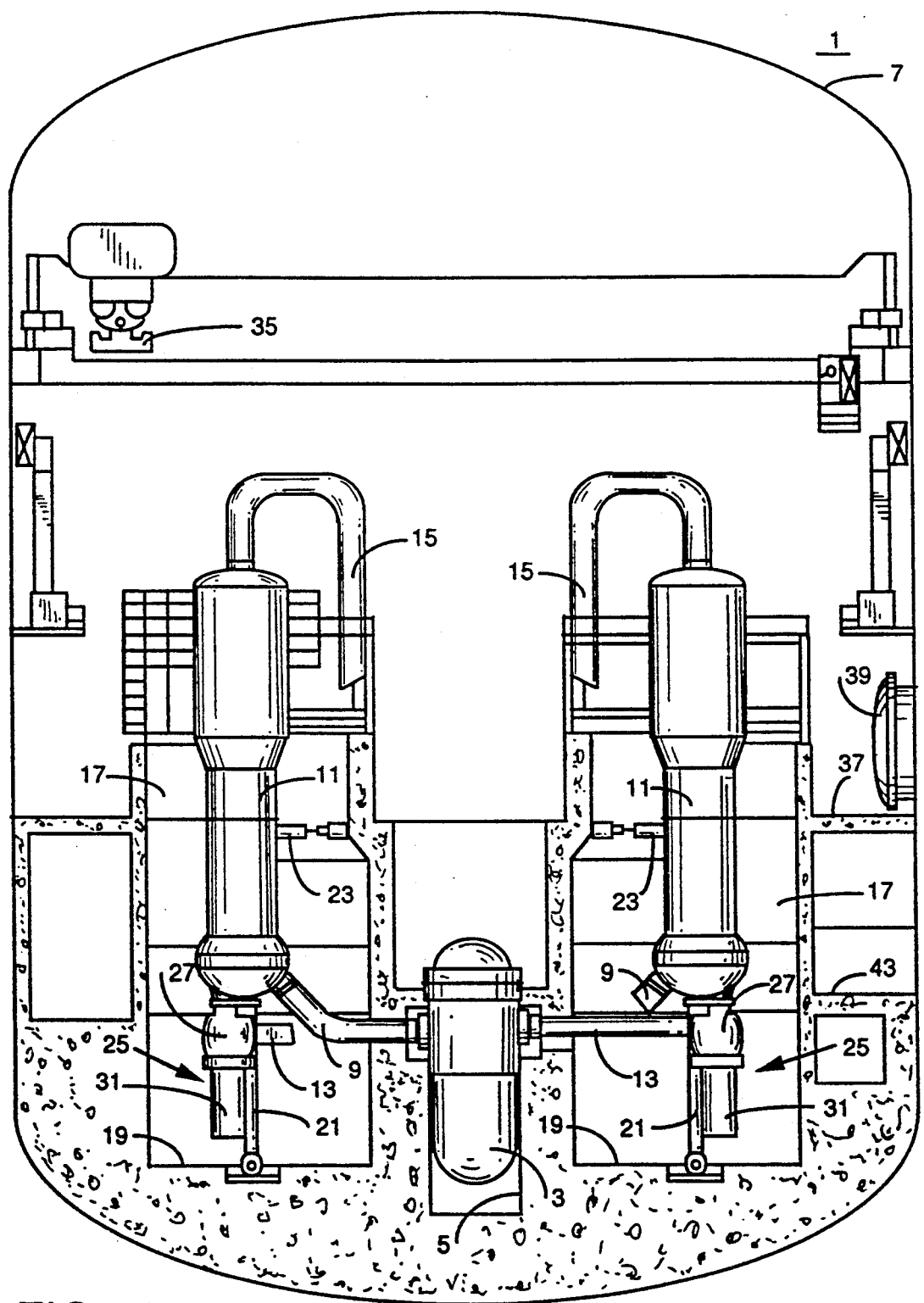
FIG. 1 is a vertical section through containment of a nuclear power plant to which the invention is applied.

FIG. 1 illustrates a pressurized water nuclear power plant in which the basic components include a reactor vessel 3 located in a concrete chamber 5 within containment 7. Reactor coolant heated by fission reactions is circulated from the reactor vessel 3 through hot leg piping 9 to a pair of steam generators 11 and back through cold leg piping 13 to the reactor vessel. Within the steam generator, the heat of the reactor coolant converts feed water into steam which is delivered through steam piping 15 to a turbine generator (not shown) outside of containment 7. The elongated steam generators 11 are each supported in a narrow chamber 17 above the floor 19 by a column support 21 and a lateral support 23.

Figure 2:
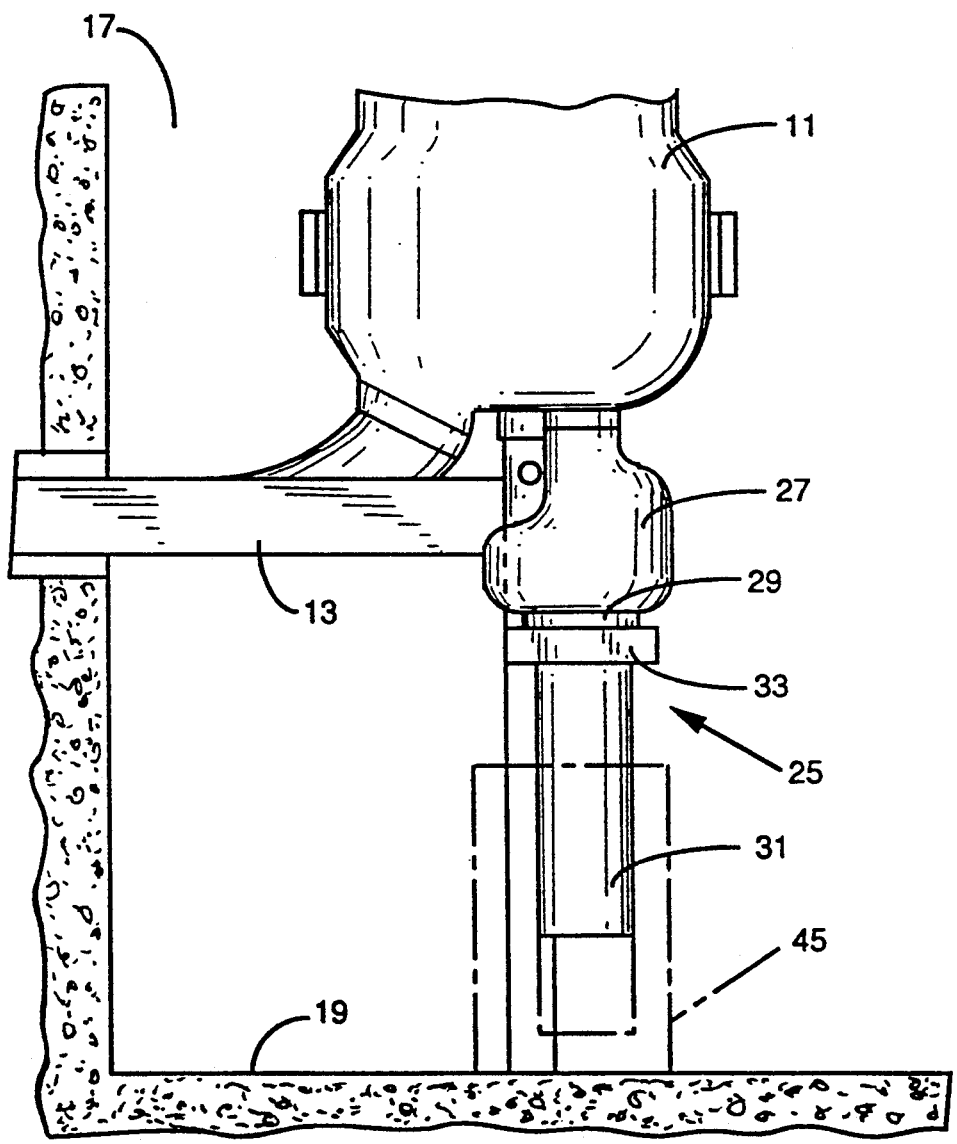
FIG. 2 is a schematic fragmentary vertical sectional view illustrating the details of the pump motor suspended beneath a steam generator which is part of the plant of FIG. 1.

As more clearly visible in FIG. 2, reactor coolant is circulated by pairs of canned motor pumps 25 depending from the lower ends of each of the steam generators 11. Each of the pumps 25 includes a pump casing 27 welded to the bottom of the steam generator 11. This casing 27 has a downwardly facing flange 27. The elongated canned motor 31 of the pump 25 has a flange 33 which is bolted to the casing flange 29 so that the motor extends downward to within a few feet of the floor 19 of the steam generator chamber 17.

Additional details of the pump 25 and its motor 31 are provided in the above mentioned U.S. patent application Ser. No. 07/489,134 filed on Mar. 5, 1990 which is hereby incorporated by reference. In this earlier application, and upright cart is positioned around the elongated motor to support the motor while the motor flange 31 is unfastened from the casing flange 27 and lowered onto the cart so that the pump impeller connected to the motor shaft clears the flange 27 while the upright cart is rolled out from under the steam generator. In this prior application, the cart carrying the pump motor is then lifted by a polar crane 35 mounted in the upper regions of containment 7 (see FIG. 1) upward out of the steam generator compartment 17, along side the steam generator 11, and lowered onto the operating deck 37 from which it is wheeled outward through the main equipment hatch 39. The cart and pump remain upright during this entire operation.

Figure 7:
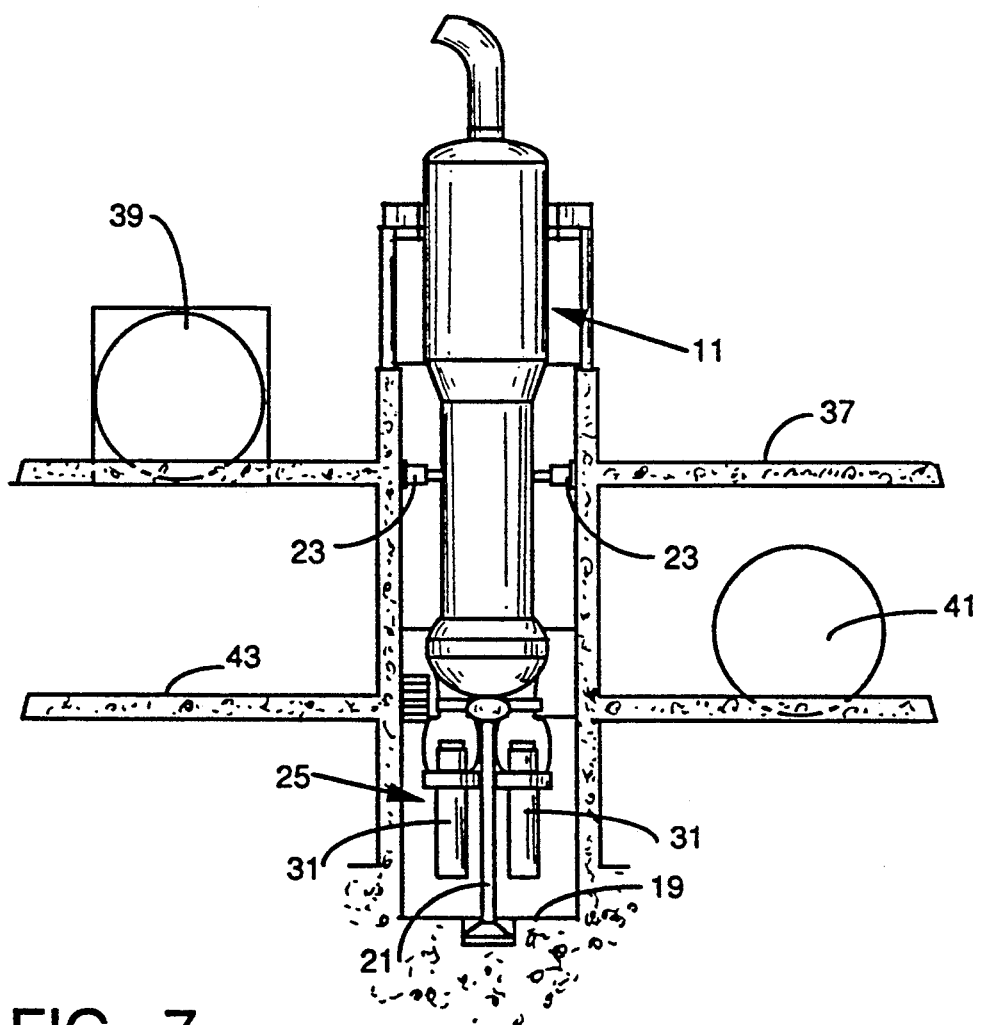
FIG. 7 is a fragmentary vertical sectional view illustrating the vertical relationship of the steam generators in the plant to the main and auxiliary equipment hatches.

As mentioned previously, there are many other tasks to be performed during an outage which require the use of the polar crane and the main equipment hatch. The present invention offers an alternative arrangement for installing and removing the main coolant pump motors 31 without use of the polar crane 35 or the main equipment hatch 39. As shown in FIG. 7, there is an auxiliary equipment hatch 41 located on a deck 43 which is below the operating deck at which the main equipment hatch 39 is located. However, this auxiliary equipment hatch 41 is not high enough to accommodate introduction and removal of the elongated pump motors 31 in an upright position. Furthermore, there are portions of the deck 43 which have low ceilings which do not accommodate transport of the pump motors in an upright position.

Figure 3:
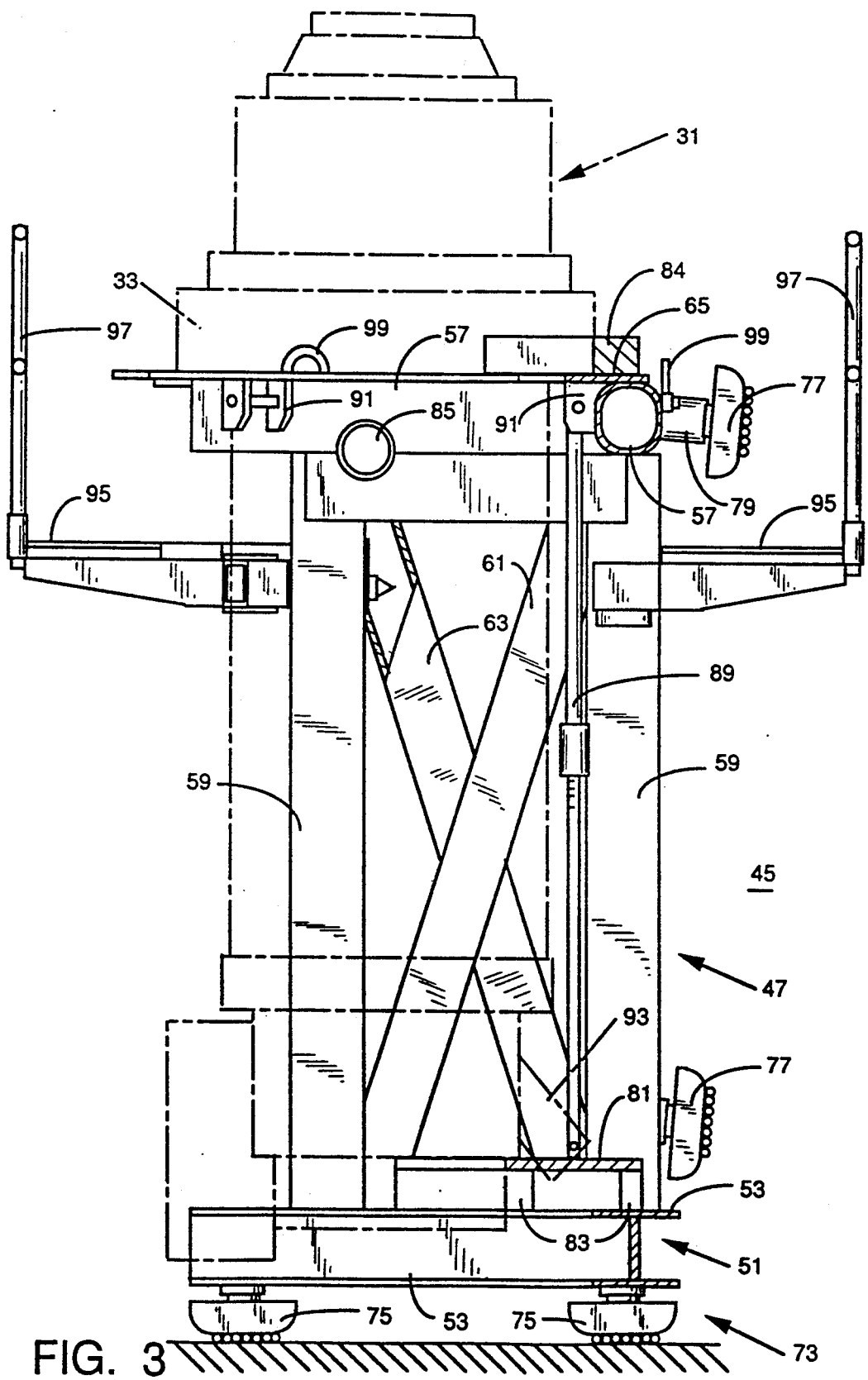
FIG. 3 is a side elevation view of a cart in accordance with the invention for servicing the pump motor shown in FIG. 2.
Figure 4:
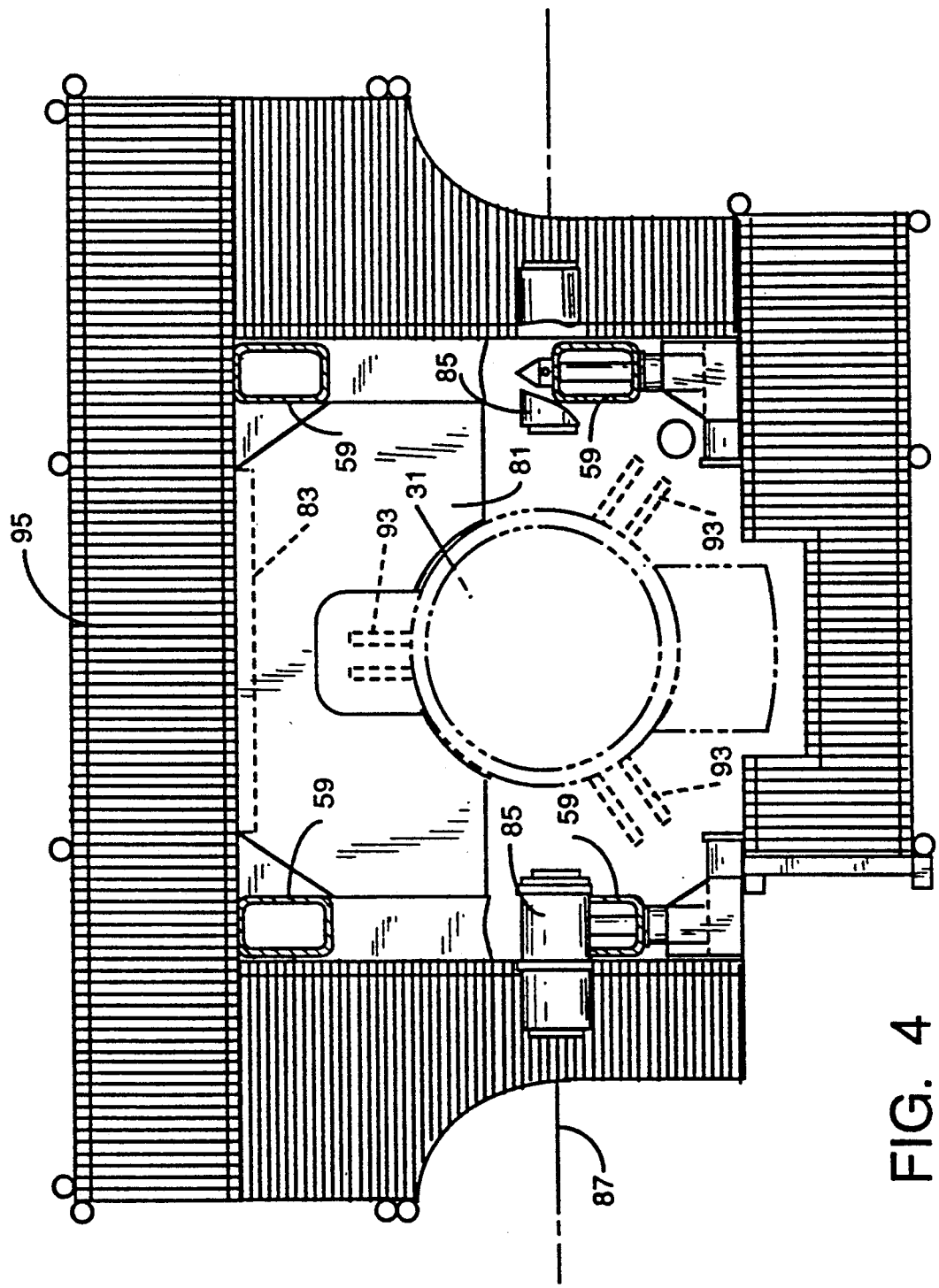
FIG. 4 is a horizontal sectional view through the cart taken along the line 4—4 in FIG. 3.
Figure 5:
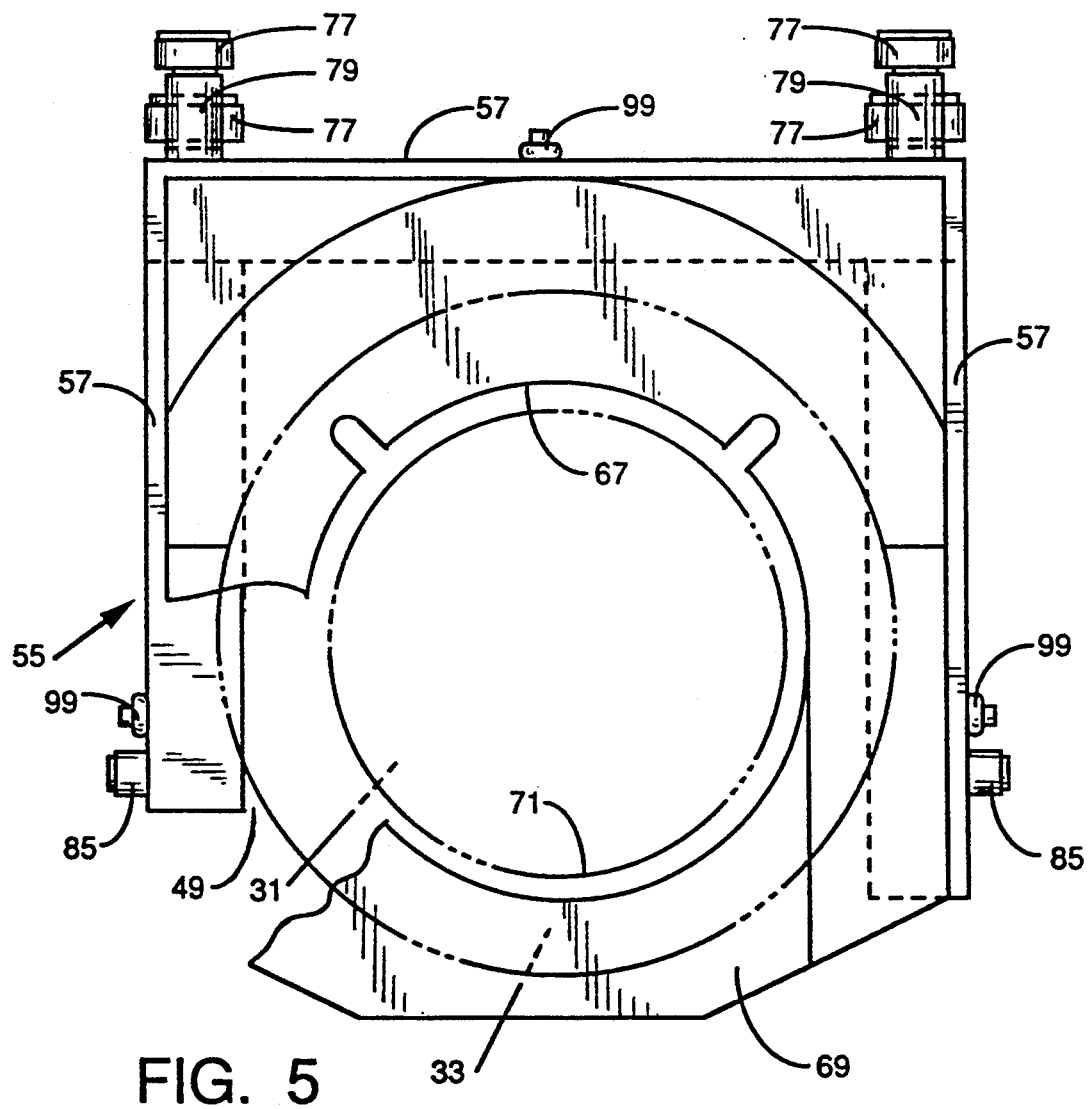
FIG. 5 is a top plan view of the cart.

Accordingly, the present invention includes a cart 45 shown in FIGS. 3-5 which can support and convey the elongated pump motors 31 in both upright and generally horizontal positions. The cart 45 has an elongated U-shaped frame 47 with an elongated opening 49 along one side. The frame 47 includes a C-shaped bottom frame section 51 composed of I-beams 53, and a C-shaped upper frame section 55 formed of tubular members 57. The C-shaped bottom and upper sections 51 and 55 are connected by four tubular columns 59. The lateral sides of the frame 47 are stiffened by cross-bracing tubular members 61 and 63. A plate 65 with a U-shaped opening 67 forms a collar on which the motor flange 33 seats to support the motor 31 on C-shaped upper frame section 55 and 57 of the cart 45 in the upright position. Once the cart is in place around the pump motor 31, a removable plate 69 with an arcuate edge 71 is butted against the plate 65 to form a circular ledge on which the motor flange 33 seats.

A roller system 73 includes four industrially rated bottom roller units 75 mounted on the four corners of the C-shaped bottom section 51 of the frame for translating the frame in the upright position. The roller system 73 further includes four industrially rated side rollers 77 which support the frame 45 for conveying the motor in a generally horizontal position. The side rollers 77 adjacent the upper end of the frame 45 are mounted on extensions 79 so that with the cart supported by the side rollers 77, the upper end of the motor 31 is higher than the bottom end. This assures that the motor flange 33 remains seated against the top plate 65.

The lower end of the motor 31 is supported in the generally horizontal position by a cradle 81 mounted on the I-beams 53 of the lower section of the frame 45 by spacers 83. An upper cradle 84 mounted on the plate 65 takes the load of the upper end of the motor with the cart 45 on its side.

The cart 45 is supported for rotation between the unfastened and generally horizontal positions by a pair of trunnions 85 defining an axis of rotation 87 transverse to the elongated opening 49 of the frame 47.

The motor 31 must be supported while it is unfastened from the pump casing and lowered sufficiently for the motor impeller to clear the pump casing flange 29. This is accomplished by three jacks 89 (only one shown for clarity) which are secured to clevices 91 mounted near the front of the tubular members 57 of the upper C-shaped frame 55 and in the center of the rear tubular member 57. The other ends of the jacks 89 are secured to clevices 93 spaced 120° apart on the bottom of the motor 31.

Portable decking 95 with hand rails 97 is removably attached to the tubular columns 59 of the cart 45 at a level which facilitates fastening and unfastening motor 31 by technicians. Lifting eyes 99 can be used to lift the cart in an upright position.

When one of the motors 31 must be removed from containment, the maintenance cart 45 is supported upright on the bottom rollers 75 and moved into position with the motor 31 received in the elongated opening 49. The jacks 89 are secured to the clevices 93 on the bottom of the motor and cinched up to take the load while the motor flange 33 is unfastened from the pump casing flange 29. The jacks 89 are then operated to lower the motor until the motor flange 33 seats on the collar plate 65. With the steam generator below its operating temperature, the motor 31 is suspended at an angle to the vertical. However, this may be accommodated by differential operation of the jacks 89.

Figure 6:
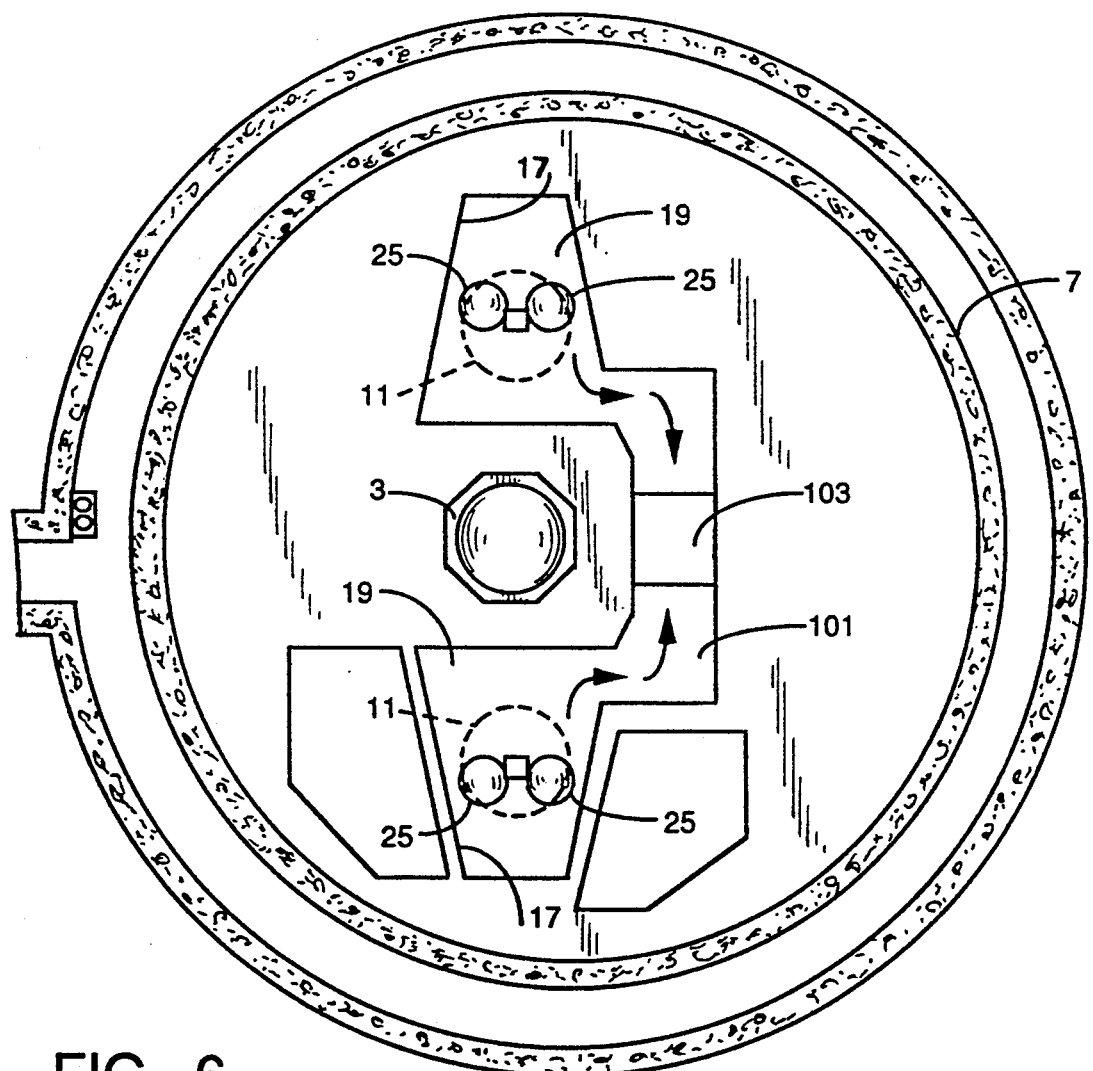
FIG. 6 is a horizontal section through containment taken along the line 5—5 in FIG. 1.

With the motor flange seated on the collar 65, the maintenance cart 45 is rolled out from under the steam generator on the bottom rollers 75. As seen in FIG. 6 by the arrows, the cart 45 is rolled across the floor 19 through a corridor 101 and onto an elevator 103 located in the corridor 101 midway between the two steam generators.

Figure 8A:
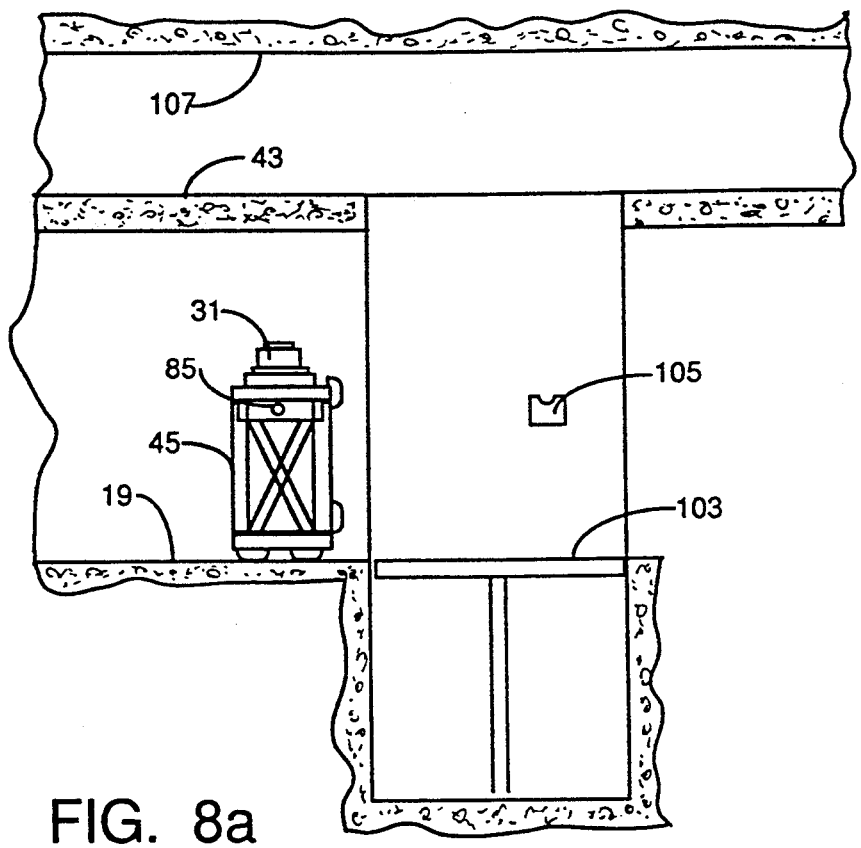
FIGS. 8 A-G are schematic illustrations of equipment and the procedure used to rotate the cart of FIGS. 3 through 5 between the upright and horizontal positions.
Figure 8B:
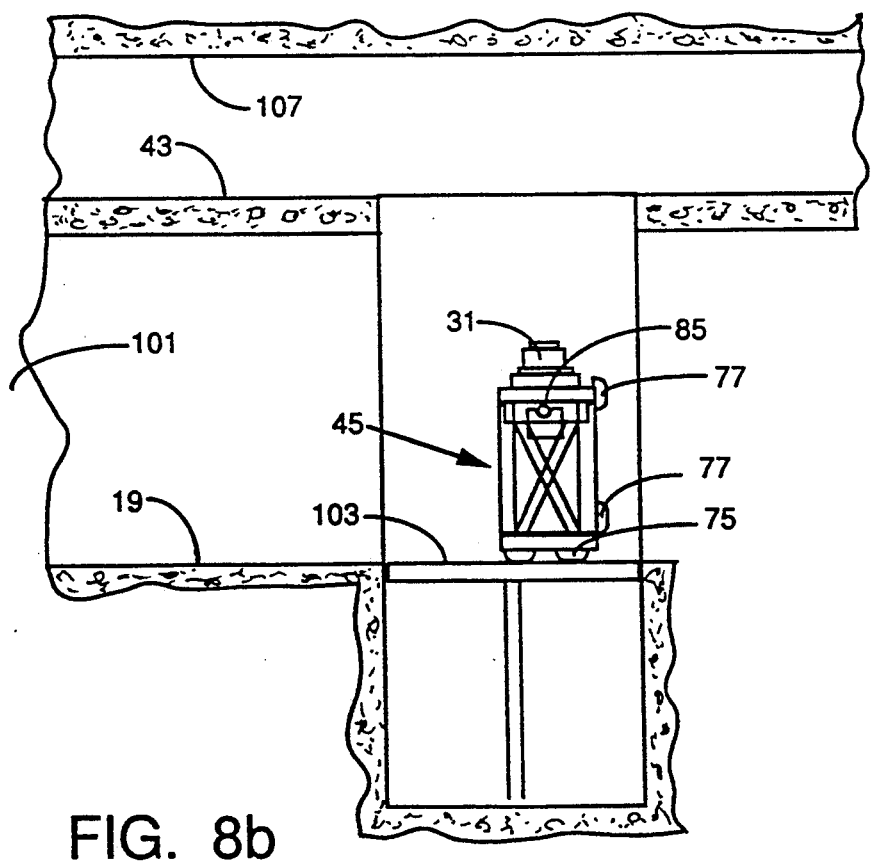
Figure 8C:
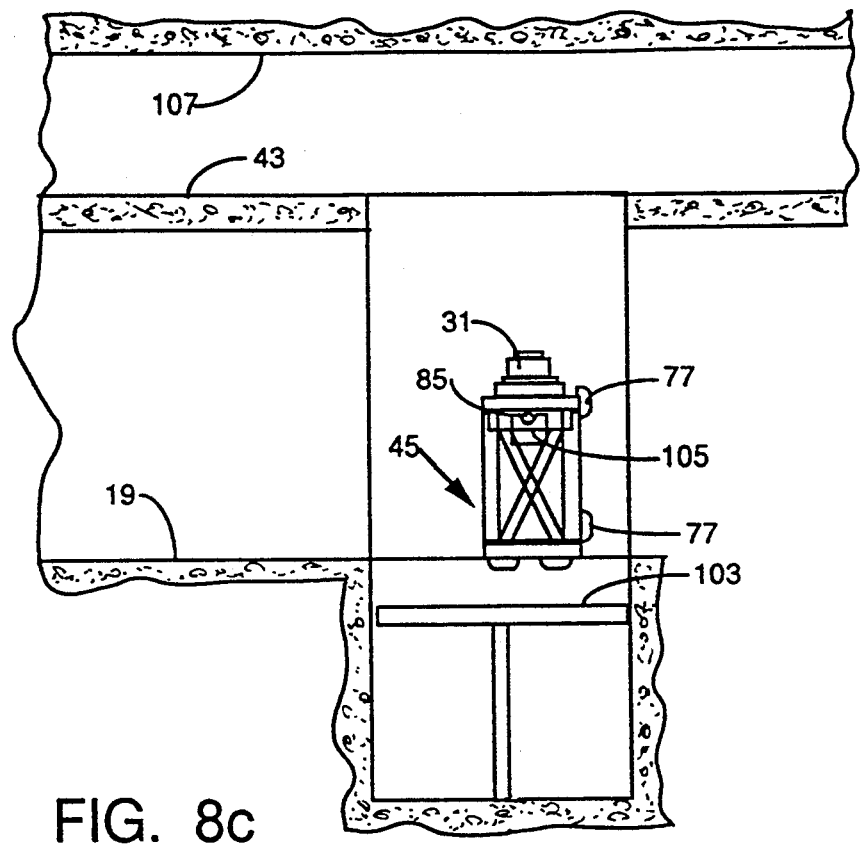
Figure 8D:
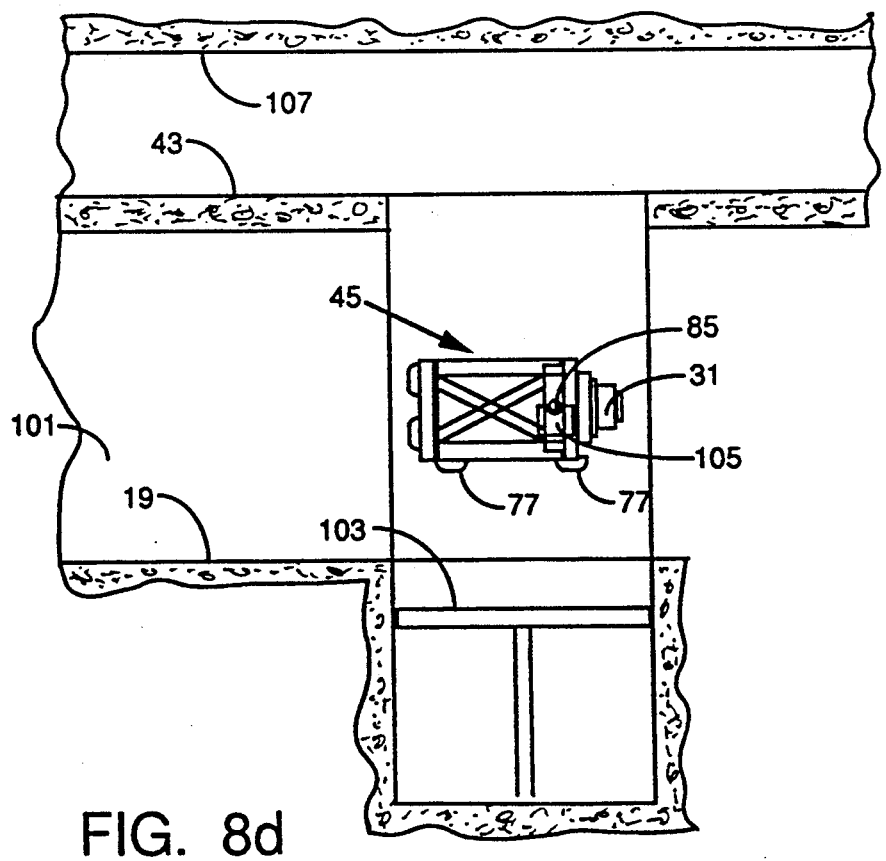
Figure 8E:
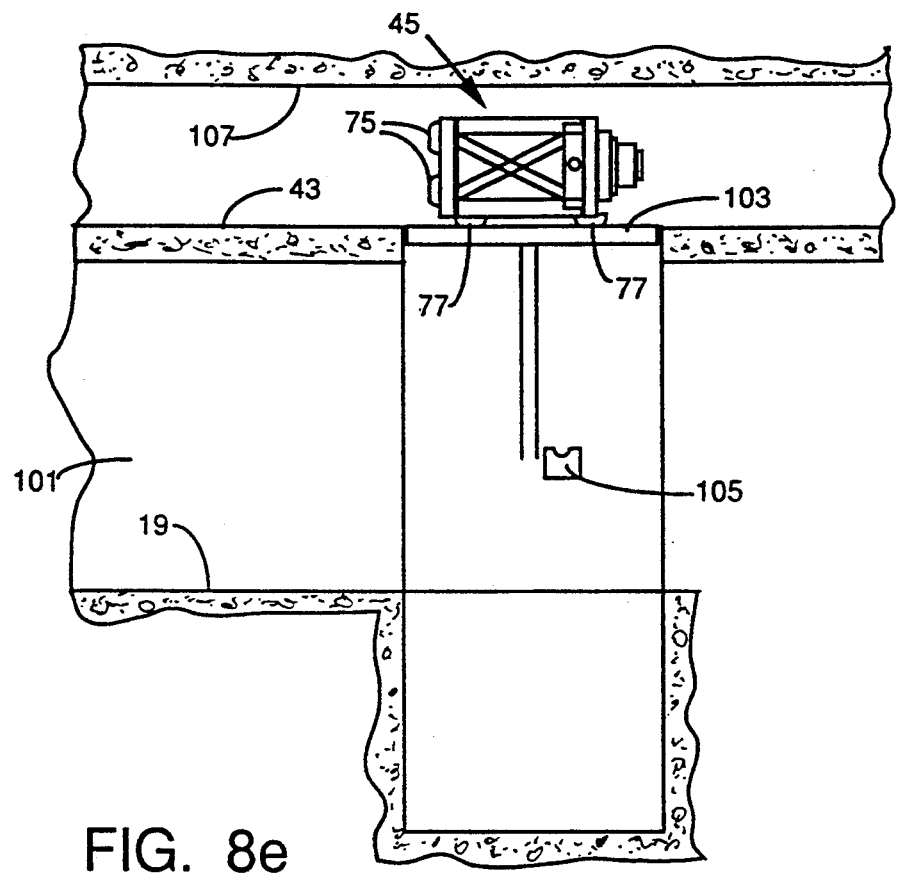
Figure 8F:
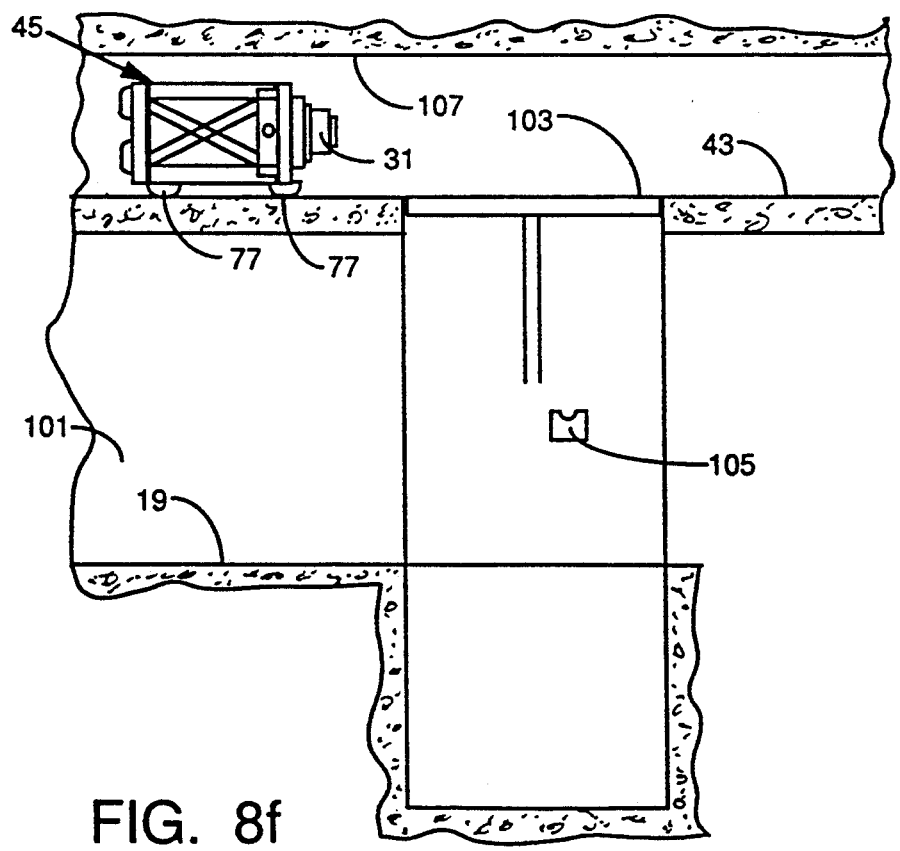
Figure 8G:
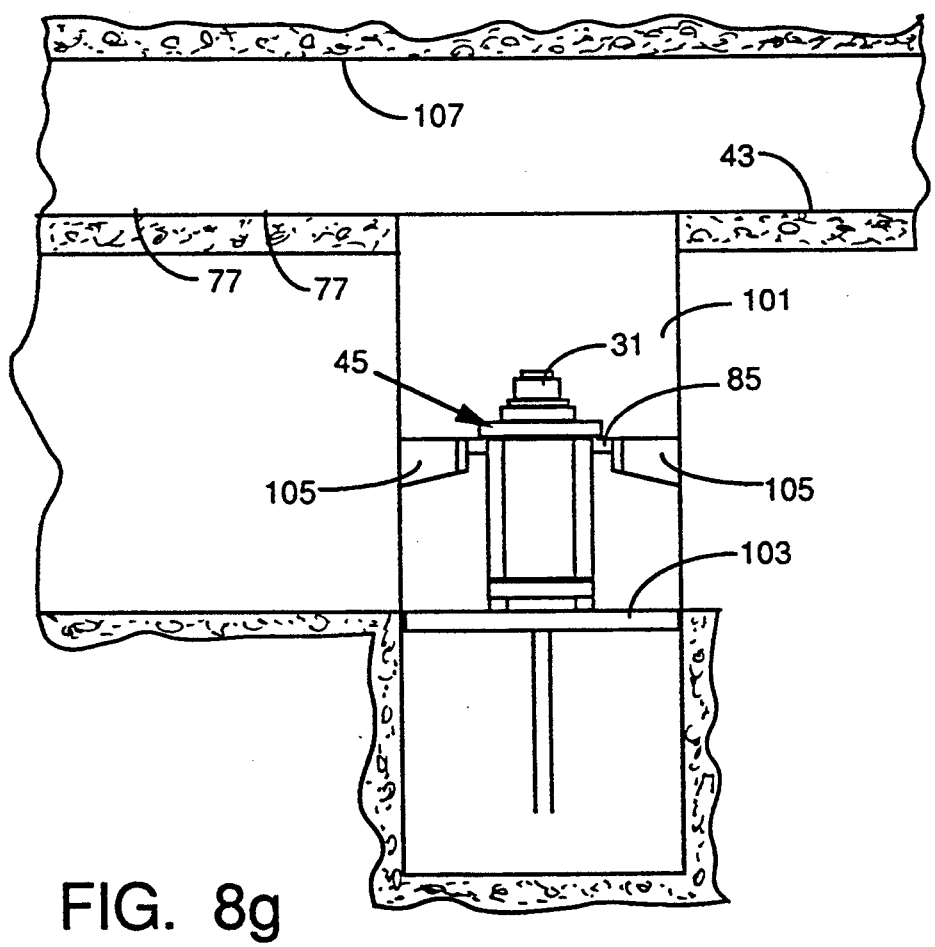

As shown schematically in FIGS. 8A-G, the maintenance cart 45 is rolled in an upright position onto the elevator 103 and positioned with the trunnions 85 aligned with saddles 105 on the walls of the corridor 101 straddling the elevator 103 as shown in FIG. 8B. The elevator is then lowered as shown in FIG. 8C so that the cart 45 carrying the motor 31 is supported by the saddles 105 through the trunnions 85. The cart is then rotated from the upright position by a block and tackle (not shown) or other suitable devices to the generally horizontal position, as shown in FIG. 8D. The elevator 103 is then raised to lift the cart 45 to the level of deck 43, as shown in FIG. 8e. The cart 45 is wheeled on the side rollers 77 off of the elevator, and across the deck 43 as shown in FIG. 8f to the auxiliary equipment hatch 41 (see FIG. 7). As previously discussed, this auxiliary equipment hatch 41 has an opening which is not sufficient to accommodate the cart 45 in the upright position, but will permit passage of the cart in the generally horizontal position. It should also be noted that the height of the ceiling 107 for the deck 43 at the elevator is also not high enough to permit advance of the cart in the upright position.

For installation of a pump motor 37, the cart 45 supporting the motor in a generally horizontal position is rolled on the side rollers 77 through the auxiliary equipment hatch 41 across the deck 43 and onto the elevator 103. The elevator 103 is then lowered below the floor 19 to engage the trunnions 85 in the saddles 105 so that the cart can be rotated to the upright position. The elevator 103 is then raised to the level of the floor 119 to lift the cart off of the saddles 105, and the cart is rolled across the floor 19 and into position under the steam generator in an upright position. The jacks 89 are then operated to raise the motor for fastening the motor flange 33 onto the pump casing flange 29.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A service apparatus for servicing an inverted pump installed above a floor and beneath a steam generator in a power plant with limited access, said pump having a pump casing with a generally downwardly facing pump casing flange, and a depending elongated pump motor having a motor flange secured to said pump casing flange; said service apparatus comprising:
a maintenance cart including:
an elongated frame having a bottom end and elongated sides with an elongated opening along one side within which said elongated pump motor is received;
support means for supporting said pump motor on said frame within said elongated opening with said frame in an upright position, and for supporting said pump motor on said frame within said elongated opening with said elongated frame in a generally horizontal position; and
roller means mounted on said cart for translating said frame in said upright position and for translating said frame in said generally horizontal position.

2. The service apparatus of claim 1 wherein said roller means comprises bottom roller means secured to said bottom end for translating said frame in said upright position and side roller means secured to a side of said frame for translating said frame in said generally horizontal position.

3. The service apparatus of claim 2 wherein said support means comprises a U-shaped collar aligned with said elongated opening and on which said motor flange seats, and wherein said side roller means comprises means supporting said frame in said generally horizontal position with a top end higher than said bottom end to maintain said motor flange seated on said U-shaped collar with said frame in said generally horizontal position.

4. The servicing apparatus of claim 3 wherein said support means further includes lower cradle means supporting a side of said elongated motor adjacent a bottom end of said motor with said frame in said generally horizontal position.

5. The servicing apparatus of claim 1 wherein said support means includes a U-shaped collar aligned with said elongated opening and on which said motor flange seats and lower cradle means supporting a side of said motor adjacent a lower end of said elongated motor with said frame in said generally horizontal position.

6. The servicing apparatus of claim 5 wherein said support means further includes jack means lowering and raising said motor between said pump casing flange and said U-shaped collar on the maintenance cart.

7. The servicing apparatus of claim 5 including positioning means supporting said cart for rotation between said upright and generally horizontal positions.

8. The servicing apparatus of claim 7 wherein said positioning means includes trunnions mounted on said U-shaped frame on an axis transverse to said elongated opening.

9. The servicing apparatus of claim 8 wherein said positioning means further includes trunnion support members supporting said cart by said trunnions for rotation between said upright and generally horizontal positions.

10. The servicing apparatus of claim 9 wherein said positioning means further includes an elevator in said floor and wherein said trunnion support members comprise saddle members straddling said elevator and supporting said maintenance cart through said trunnions with said elevator lowered.

11. A method of servicing an inverted pump installed above a floor and beneath a steam generator in containment in a power plant with limited access, wherein said pump has a pump casing secured to said steam generator and a generally downwardly facing pump casing flange, and a depending elongated pump motor having a motor flange fastened to said pump casing flange, said method comprising the steps of: positioning a maintenance cart comprising an elongated U-shaped frame defining an elongated opening in an upright position with the motor received in said elongated opening; disconnecting said motor from said pump casing and transferring support of said motor from the pump casing to said maintenance cart; translating said cart with said motor in an upright position across said floor out from under said pump casing; rotating said frame with said motor from said upright position to a generally horizontal position with said elongated opening facing upward; and translating said frame with said motor in said generally horizontal position to remove said motor from containment.

12. The servicing method of claim 11 wherein said step of rotating said cart and motor comprises supporting said cart by trunnions and rotating said cart between said upright and generally horizontal positions about said trunnions.

13. The servicing method of claim 12 including translating said cart in an upright position onto an elevator straddled by saddle supports to align the trunnions with the saddle supports, lowering the elevator to transfer support of said motor and maintenance cart to said saddle supports through said trunnions, rotating said cart with said elongated motor about said trunnions, and raising said elevator to lift said trunnions off said saddle supports.

14. The servicing method of claim 13 further including raising said elevator to another higher floor in said generally horizontal position, and translating said maintenance cart in said generally horizontal position off of said elevator and out through an access hatch at said another higher floor.

15. The method of claim 11 further including installing said elongated motor by: supporting said motor in said maintenance cart in a horizontal position and translating said motor and said maintenance cart in said generally horizontal position into containment; rotating said cart and motor into an upright position and translating said motor and cart in said upright position across said floor to position said motor under said pump casing; and transferring support of said motor from said cart to said pump casing flange.

16. The servicing method of claim 15 wherein said rotating step comprises: providing trunnions on said maintenance cart, translating said maintenance cart with said motor in a generally horizontal position onto an elevator staddled by trunnion supports, lowering said elevator to transfer support of said maintenance cart and motor to said trunnion supports through said trunnions; rotating said cart from said generally horizontal position to said upright position about said trunnions; raising said elevator to lift said cart off said trunnion supports and translating said cart and motor in said upright position off of said elevator.

* * * * *